United States Patent [19]
Vedder et al.

[11] 3,726,466
[45] Apr. 10, 1973

[54] BRAZING FIXTURE

[75] Inventors: Helmut Vedder; Edward R. Byrnes; Ronald D. Rogers, Rockford, Ill.

[73] Assignee: Alco Standard Corporation, Valley Forge, Pa.

[22] Filed: May 28, 1971

[21] Appl. No.: 148,003

[52] U.S. Cl. ............. 228/44, 29/157.3 R, 29/202 R, 269/321 W
[51] Int. Cl. ............................................. B23k 19/00
[58] Field of Search .................. 29/470, 484, 493, 29/157.3, 202; 228/4, 44, 5, 6; 269/287, 321 W, 240

[56] References Cited

UNITED STATES PATENTS

| | | | |
|---|---|---|---|
| 3,647,130 | 3/1972 | Hahne | 228/5 |
| 3,612,387 | 10/1971 | Rathbun | 228/6 |
| 3,473,210 | 10/1969 | Klank | 29/202 R |
| 3,136,038 | 6/1964 | Huggins et al. | 29/157.3 |
| 2,794,243 | 6/1957 | Schweller | 29/472.3 |

Primary Examiner—Robert D. Baldwin
Assistant Examiner—Robert J. Craig
Attorney—Wolfe, Hubbard, Leydig, Voit & Osann

[57] ABSTRACT

A fixture for holding a stack of workpieces in assembled relationship during furnace brazing of the workpieces by radiant heat. The fixture comprises upper and lower clamping plates adapted to be drawn together to clamp the workpieces. Fins made of highly heat conductive material project vertically from the plates and block the radiant heat directed horizontally across the plates, the fins conducting such heat into the plates to raise the temperature of the plates and promote uniform heating of the workpieces from top to bottom.

7 Claims, 6 Drawing Figures

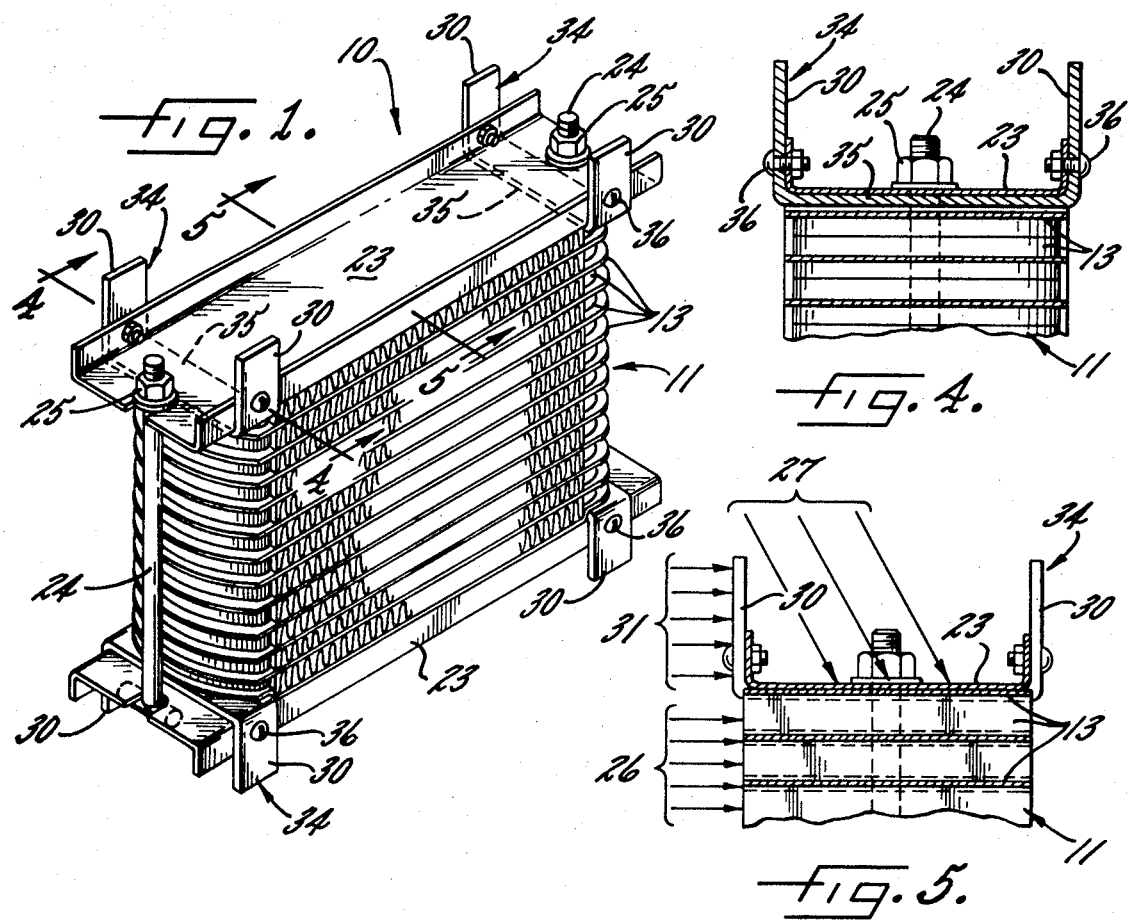
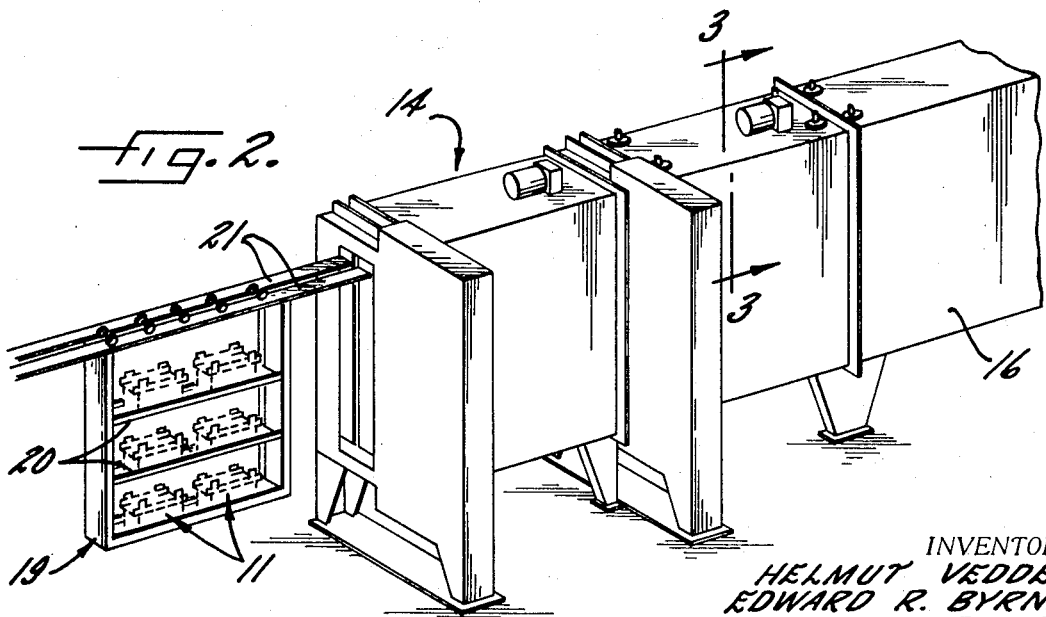

BRAZING FIXTURE

BACKGROUND OF THE INVENTION

This invention relates to a fixture for holding a stack of workpieces in assembled relationship during furnace brazing of the workpieces by radiant heat. More particularly, the invention relates to a fixture having top and bottom clamping plates adapted to be drawn toward one another to clamp the stack of workpieces together and to securely hold the stack as the workpieces are brazed.

The fixture of the present invention is particularly advantageous when used with workpieces which are brazed in a furnace of the type disclosed in Irvin P. Bielefeldt U. S. Pat. application Ser. No. 51,612, filed July 1, 1970 and now U.S. Pat. No. 3,609,295. In such a furnace, the workpieces are located in a heating chamber and the brazing is effected by the heat radiated from heating elements located in the chamber on opposite sides of the workpieces and disposed in generally vertical planes. Heat radiated from the heating elements thus strikes the side surfaces of the workpieces substantially at right angles to achieve optimum heat transfer from the heating elements to the side surfaces of the workpieces.

SUMMARY OF THE INVENTION

The general aim of the present invention is to provide a new and improved workpiece fixture of the above character which promotes more uniform heating of the top and bottom surfaces of the workpieces to substantially the same temperature as the side surfaces of the workpieces.

A correlated object is to provide a fixture which eliminates cold areas at the top and bottom surfaces of the workpieces by overcoming the heat sinking characteristics of the clamping plates and, at the same time, by effecting heating of the clamping plates to substantially the same temperature as the side surfaces of the workpieces in spite of the fact that the heat radiated from the heating elements is directed toward the faces of the clamping plates at acute included angles.

A more detailed object is to achieve the foregoing by providing the top and bottom clamping plates with highly heat conductive fins which project vertically from the plates to block or catch the heat radiated horizontally across the plates and to conduct such heat into the plates so as to increase the temperature thereof to a value above that to which the plates would be heated by direct radiation.

The invention also resides in the novel and comparatively simple construction of the fins and in the unique correlation between the material of the plates and the material of the fins to effect conductive heating of the plates while providing plates with sufficient rigidity to clamp the workpieces without distorting.

These and other objects and advantages of the invention will become more apparent from the following detailed description when taken in conjunction with the accompanying drawings.

BRIEF DESCRIPTION OF THE DRAWINGS

FIG. 1 is a perspective view of a new and improved brazing fixture embodying the novel features of the present invention.

FIG. 2 is a fragmentary perspective view of an exemplary furnace within which the brazing may be performed.

FIGS. 4 and 5 are enlarged fragmentary cross-sections taken substantially along the lines 4—4 and 5—5, respectively, of FIG. 1.

DETAILED DESCRIPTION OF THE PREFERRED EMBODIMENTS

Figure 3:
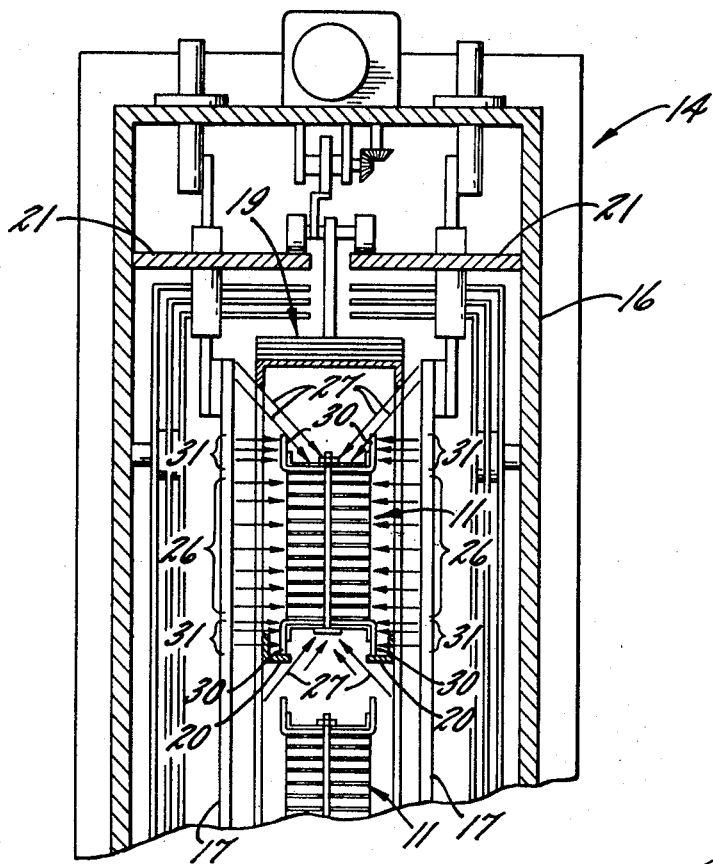
FIG. 3 is an enlarged fragmentary cross-section taken substantially along the line 3—3 of FIG. 2.

As shown in the drawings for purposes of illustration, the invention is embodied in a fixture 10 for temporarily clamping a stack 11 of workpieces 13 in assembled relation while the workpieces are brazed together in a furnace 14 (FIG. 2). By way of example only, the workpieces have been shown to be aluminum parts, the ultimate brazed object formed by the workpieces being a heat exchanger such as a radiator or condenser. The brazing is effected in the furnace under vacuum conditions and by radiant heat while the workpieces are exposed to magnesium vapors so as to avoid the need for using a brazing flux.

The furnace 14 is similar to that disclosed in the aforementioned patent and comprises a heating chamber 15 (FIG. 3) defined by a tunnel of rectangular cross-section extending through a vessel 16 which is adapted to be evacuated by a vacuum pump (not shown). Electric resistance heating elements 17 are disposed in vertical planes within the chamber 15 and, in this instance, the heating elements are in the form of vertically extending and horizontally spaced bars which are located on opposite sides of the chamber and the workpieces 13 within the chamber. During the brazing operation, several stacks 11 of workpieces are supported within the chamber on a carrier 19 (FIGS. 2 and 3) comprising a window-like frame with horizontal rails 20 upon which the workpieces rest. The carrier is adapted to be advanced into one end of the chamber and out of the opposite end of the chamber along overhead rails 21 attached to the vessel 16. Reference may be made to the aforementioned patent for a more detailed description of the furnace 14 and the carrier 19.

As shown in FIGS. 1 and 4, the fixture 10 comprises a rectangular channel-like top clamping plate 23 overlying the stack 11 of workpieces 13 and a similarly shaped bottom clamping plate which underlies the workpieces. Bolts 24 extend vertically through the end portions of the top and bottom plates and are threaded into nuts 25 which, when tightened, draw the plates together to clamp the workpieces in rigidly assembled relationship. Herein, each clamping plate is approximately 1/16 inch thick and is made of a comparatively high strength metal such as stainless steel. Accordingly, the plates are sufficiently thick and strong as to remain flat and planar when clamped against the workpieces and, since the plates do not warp or distort when drawn toward one another, substantially uniform clamping pressure is exerted across all areas of the workpieces.

It will be seen in FIGS. 3 and 5 that the radiant heat rays 26 directed from the heating elements 17 toward the vertical side surfaces of each stack 11 of workpieces 13 strike such surfaces at substantially right angles, thereby resulting in maximum heat transfer from the heating elements to the workpieces and effecting substantially uniform heating of the major area of each side surface from top to bottom. The heat rays 27, however, which are directed toward the top and bottom clamping plates 23 strike the plates at acute included angles which result in a smaller heat transfer efficiency factor and thus such rays are not capable of heating the clamping plates and the top and bottom surfaces of the workpieces to the same high temperature that the horizontal rays 26 heat the side surfaces of the workpieces. In addition, the clamping plates tend to act as heat sinks and to absorb heat from the top and bottom portions of the workpieces.

In accordance with the present invention, unique fins 30 made of highly heat conductive material project vertically from the clamping plates 23 to catch the heat rays 31 (FIGS. 3 and 5) directed horizontally across the plates and to conduct the heat of such rays into the plates thereby to heat the plates to higher temperatures than would be possible if the plates were heated by the inclined rays 27 alone. Cold spots at the top and bottom portions of the stack 11 thus are reduced and more uniform heating of the workpieces 13 from top to bottom is effected since, through the provision of the fins, the heat sinking characteristics of the clamping plates are obviated and, at the same time, efficient use is made of the horizontally directed heat rays 31 which otherwise would simply pass across the surfaces of the plates.

Figure 6:
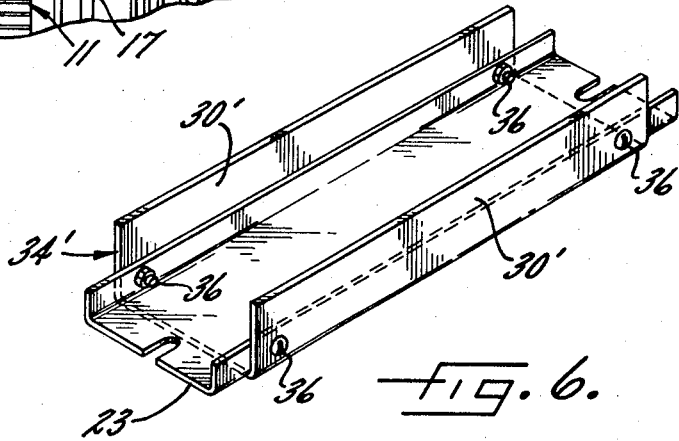
FIG. 6 is a perspective view of a clamping plate of a modified fixture embodying the features of the invention.

More specifically, the fins 30 shown in FIGS. 1, 4 and 5 are made of copper and one fin is located adjacent each end of each clamping plate 23 along each side edge of such plate, there thus being a total of eight fins in all. The fins on the upper clamping plate project approximately 2 inches upwardly from the plane of the plate while the lower fins depend a corresponding distance from the lower clamping plate. Opposing fins on the same end of each plate preferably are formed by the legs of a U-shaped copper member 34 which has a width of about 1-½ inches and whose bridge 35 extends across the inner side of the plate. The fins on the same side edge of each plate thus are spaced from one another along the plate but, as shown in FIG. 6, each plate may be provided with continuous fins 30' which extend along the entire length of the plate and which are formed by the legs of an elongated channel-shaped member 34' made of copper.

The fins 30 and 30' may be welded to the plates 23 or secured by any suitable means such as bolts 36. In the embodiment shown in FIGS. 1, 4 and 5, the bridges 35 are seated in depressions formed at the ends of the upper and lower workpieces 13 and thus the clamping plates lie flat against the workpieces. In the embodiment shown in FIG. 6, the bridges of the channel members 34' simply lie flat against the top and bottom surfaces of the upper and lower workpieces.

With the foregoing arrangement, the vertically projecting fins 30 or 30' act as "heat fences" and catch the heat rays 31 directed horizontally across the top of the top clamping plate 23 and the bottom of the bottom clamping plate. The fins thus are heated by the rays 31 and such heat is conducted edgewise through the fins and into the clamping plates to heat the latter to a temperature higher than is effected by the direct radiation from the inclined rays 27. Accordingly, the heat from the rays 31 is captured to heat the top and bottom portions of the workpieces 13 and, in addition, the heating of the clamping plates to a higher temperature by the rays 31 tends to negate the heat sinking tendencies of the plates and thereby reduces cold spots on the areas of the workpieces adjacent the plates. Thus, more uniform heating of the workpieces from top to bottom is achieved as a result of providing the plates with the highly heat conductive copper fins and yet, at the same time, the rigidity of the fixture 10 is maintained as a result of making the plates of relatively thick and high strength stainless steel which does not distort under clamping pressure.

We claim as our invention:

1. A fixture for holding a stack of workpieces in assembled relation during furnace brazing of the workpieces by radiated heat, said fixture comprising a top clamping plate overlying the workpieces and a bottom clamping plate underlying the workpieces, means interconnecting said plates and operable to draw the plates toward one another to clamp the workpieces between the plates, said plates being made of metal with sufficient thickness and rigidity to clamp the workpieces securely without being distorted, and fins made of a metal which is different from the metal of said plates and which is more highly heat conductive than the metal of said plates, said fins projecting upwardly from at least two opposite side edge portions of said top clamping plate and projecting downwardly from the corresponding side edge portions of said bottom clamping plate to block radiated heat directed across said plates whereby such heat is conducted edgewise through said fins and is conducted into said plates and said workpieces.

2. A fixture as defined in claim 1 in which the fins on opposite side edge portions of each plate are the legs of a U-shaped member made of said highly heat conductive material and having a bridge which is sandwiched between the respective plate and the adjacent surface of the stack of workpieces.

3. A fixture as defined in claim 2 in which said fins extend continuously along the side edge portions of said plates.

4. A fixture as defined in claim 2 in which two fins are spaced from one another along each of said side edge portions and are located near the ends of said plates.

5. A fixture as defined in claim 1 in which said fins are made of copper.

6. A fixture as defined in claim 5 in which said plates are made of stainless steel.

7. A fixture for holding a stack of workpieces in assembled relation as the workpieces are brazed together in a furnace chamber having radiant heating elements located in generally vertical planes on two opposite sides of the workpieces to radiate heat horizontally toward the workpieces, said fixture comprising a top clamping plate overlying the workpieces and a bottom clamping plate underlying the workpieces, means interconnecting said plates and operable to draw the plates toward one another to clamp the workpieces between the plates, said plates being made of metal with sufficient thickness and rigidity to clamp the workpieces securely without being distorted, and fins made of a metal which is different from the metal of said plates and which is more highly heat conductive than the metal of said plates, said fins projecting upwardly from two opposite side edge portions of said top clamping plate and projecting downwardly from the corresponding side edge portions of said bottom clamping plate, and said fins facing said heating elements to block the heat radiated horizontally across the top of said top plate and across the bottom of said bottom plate by said elements, the fins on opposite edge portion of each plate being defined by the legs of a U-shaped member made of said highly heat conductive material and having a bridge which is sandwiched between the respective plate and the adjacent surface of the stack of workpieces.

* * * * *